Dec. 2, 1969    J. D. HAMILTON    3,482,200
LIQUID LEVEL GAUGE SENDER UNIT
Filed Feb. 2, 1967
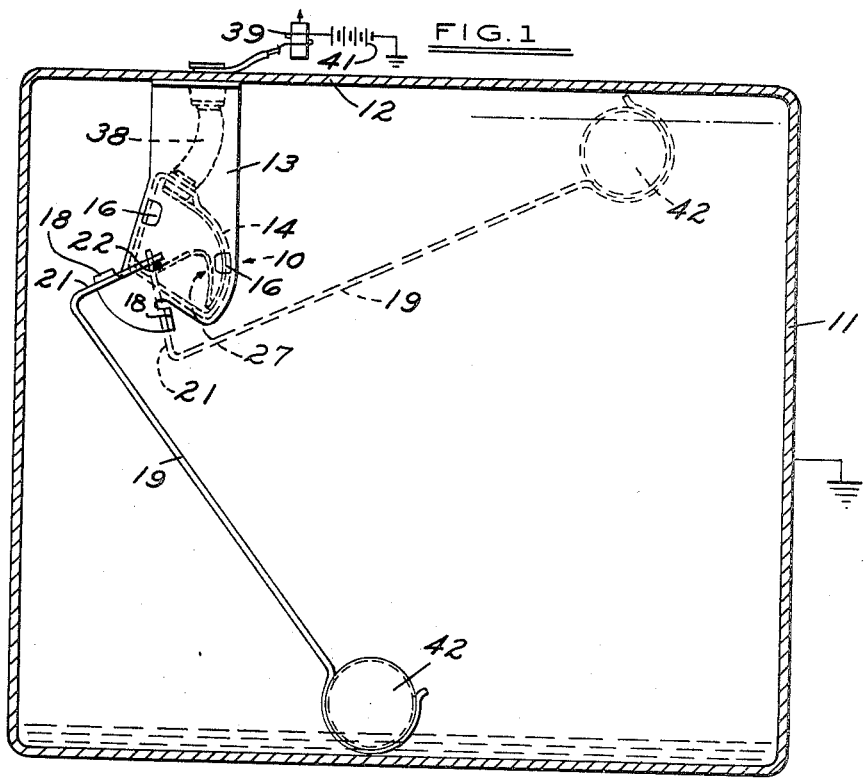
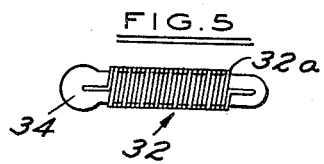
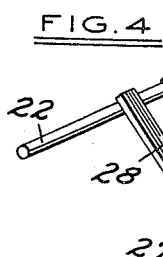
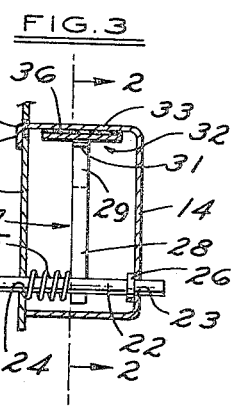
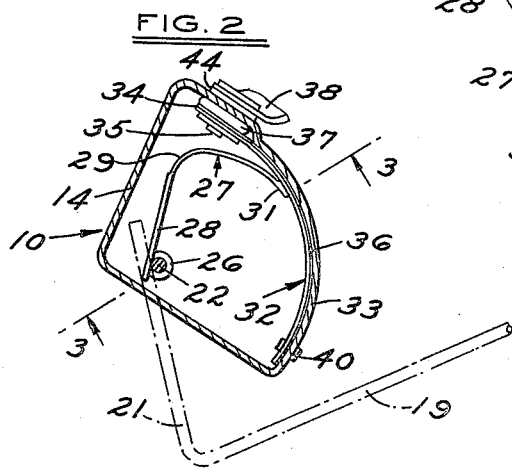
INVENTOR
JOHN D. HAMILTON
BY
John R. Faulkner
William E. Johnson
ATTORNEYS United States Patent Office 3,482,200
Patented Dec. 2, 1969

3,482,200
LIQUID LEVEL GAUGE SENDER UNIT
John D. Hamilton, Columbus, Ind., assignor to Ford Motor Company, Dearborn, Mich., a corporation of Delaware
Filed Feb. 2, 1967, Ser. No. 613,609
Int. Cl. H01c 13/00
U.S. Cl. 338—33
3 Claims

ABSTRACT OF THE DISCLOSURE

An arcuate wall of a housing of a sender unit utilized in a system indicating the amount of fluid in a tank has a wire wound resistance element along a portion of the length thereof. A shaft rotatably mounted in the housing supports an integral spring and contact member, the contact end of which member is mover over the resistance element by rotation of the shaft in response to a change in the liquid level within the tank. The change of position of the contact end of the spring and contact member on the resistance element results in a change in the resistance in a gauge circuit whereby the gauge will indicate the level within the tank.

BACKGROUND OF THE INVENTION

This invention relates to a sender unit for utilization in a liquid level indicating gauge system and, more particularly, to a sender unit for utilization in such a system wherein an integral spring and contact member is utilized for movement over a resistance element to effect a change of resistance in the gauge circuit.

Prior art sender units employ as the spring and contact portion thereof a unit generally comprising a supporting member, a spring member and a contact element. The contact element of prior sender units formed a single point contact with the resistance element utilized in such units. Such a point contact element was subject to excessive wear and it was found that sender units utilizing the point contact element would fail in a relatively short period of time when subjected to normal use conditions in the fuel tanks of motor vehicles.

SUMMARY OF THE INVENTION

The preferred sender unit of this invention has a housing wherein an arcuate wall portion thereof is located about a selected axis of the housing. A wire wound resistance element is positioned along and secured to the arcuate wall portion of the housing. A shaft, which extends through and is rotatably supported by the housing along the selected axis, has secured thereto one end of an integral spring and contact member. The other end of the spring and contact member is in resilient engagement with the resistance element. More particularly, the integral spring and contact member is milled from a single piece of beryllium copper in such a manner that at the end thereof secured to the shaft the member is of a selected thickness, that at a mid-section thereof the thickness of the member is reduced to allow a flexing of the member, and that at the contact end of the member in engagement with the resistance element the thickness of the member is equal to the thickness of the section thereof secured to the shaft.

The utilization of an integral spring and contact member in the sender unit of this invention has substantially improved the reliability of the sender unit as a whole. Also, the cost of manufacturing the sender unit has been reduced.

BRIEF DESCRIPTION OF THE DRAWINGS

FIGURE 1 is an elevational view which shows a sender unit of this invention as utilized in the fuel tank of a motor vehicle. FIGURE 2, taken along line 2—2 of FIGURE 3, is a view which shows greater detail of the internal structure of the sender unit. FIGURE 3 is a view taken along line 3—3 of FIGURE 2. FIGURE 4 is a perspective view which shows in detail the integral spring and contact member of the sender unit. FIGURE 5 is a view which shows in detail the resistance element of the sender unit.

DESCRIPTION OF THE PREFERRED EMBODIMENT

In the description of the preferred embodiment of the sender unit of this invention, the unit will be described as being utilized in the fuel tank of a motor vehicle. However, it should be understood that the preferred use of the sender unit of this invention is merely illustrative and that the sender unit may be utilized in many other applications.

Referring now to the drawings and, more particularly, to FIGURE 1, there is shown therein the sender unit of this invention, generally designated by the numeral 10. The sender unit 10 is mounted in a fuel tank 11 of a motor vehicle and is suitably supported from an upper wall 12 of the tank 11 by a support member 13. The support member 13 is formed of a single sheet of metal and extends downwardly from the upper wall 12 of the tank 10. A housing 14 of the sender unit 10 has a pair of tabs 16 integral therewith. The tabs 16 secure the housing 14 to the support member 13 by extending through openings 17 in the support member 13 and then being bent over.

As is best seen in FIGURE 1, the support member 13 extends slightly below the lowermost portion of the housing 14 and terminates in a section having two outwardly extending tabs 18. Respective ones of the tabs 18 cooperate with a generally "L" shaped supporting member 19 to limit the rotative movement of the member 19 in selected directions. The "L" shaped supporting member 19 is atached near the free end of its shorter leg 21 to a shaft 22 which extends across the housing 14. The shaft 22 is supported for rotative movement at one end thereof in an opening 23 in the housing 14 and the other end thereof in an opening 24 in the support member 13 (FIGURE 3). The shaft 22 is biased by a spring 25 such that an enlarged portion 26 thereof is forced into engagement with the housing 14 to stabilize the shaft 22 within the housing 14.

Secured to the shaft 22 is a unique integral spring and contact member, generally identified by the numeral 27 in FIGURE 4. The integral spring and contact member 27 is milled from a single piece of metal so as to have a section 28 thereof of enlarged cross section, the enlarged section 28 extending along a substantial portion of the member 27. A mid-section 29 of the spring and contact member 27 is reduced in thickness thereby allowing a flexibility in the member 27 which is depicted best in FIGURE 2. The smallest section of the member 27 is the contact section 31 thereof which may be of the same thickness as the enlarged section 28 of the member 27. This contact section 31 provides a flat surface thereon for engaging and moving along, in at least line contact with, a resistance element, generally designated by the numeral 32 in FIGURE 5. Preferably, the contact section 31 will form an area contact with the resistance element 32.

As is best seen in FIGURE 2, the resistance element 32 is secured to an arcuate side wall 33 of the housing 14. The radius locating the arcuate side wall 33 has its center located on the center line of the shaft 22. A rivet 35 secures a first end 34 of the resistance element 32 to a thin sheet of electrical insulating material 36, to an insulating spacing member 37, to the housing 14 and to a conductive strap 38. The conductive strap 38, which is insulated from the wall 33 by insulating member 44, passes through an insulating portion of the upper wall 12 of the tank 11 and is connected to a guage 39, a battery 41 and ground. A non-conductive fastener 40 (FIGURE 2) secures the other end of the resistance element 32 to the wall 33.

The integral spring and contact member 27, as best seen in FIGURE 2, is sufficiently flexible because of reduced thickness at its mid-section 29 that when assembled it assumes a bowed position wherein the contact section 31 thereof is in resilient engagement with the resistance element 32. The contact section 31 of the member 27 forms, at least a line contact, and preferably an area contact, between the resistance element 32 and the member 27 whereby extremely superior wear qualities are obtained from the unit over those units known in the prior art.

The "L" shaped supporting member 19 supports at the free end of the long leg thereof a float 42. As the fluid in the tank 11 raises from the lower level (indicated in solid lines in FIGURE 1) to the upper level (indicated in dashed lines in FIGURE 1), the spring and contact member 27 is rotated by joint movement of the float 42, the support member 19 and the shaft 22. The member 27 is thus moved to different relative positions along the resistance element 32. As the contact section 31 of member 27 moves along the element 32, a change will occur in the resistance of the circuit established through battery 41, the gauge 39, the conductive strap 38, the conductive rivet 35, the Nicrome wire portion 32a of the resistance element 32, the member 27, the shaft 22, the support member 13 and the tank 11. As the resistance in the described circuit changes, the gauge 39 moves to indicate the exact level of fluid within the tank 11.

By the utilization of the integral spring and contact member 27, which is made flexible because of the reduced thickness of its mid-section 29, a substantially improved sender unit has been achieved. The reduced section 29 of the member 27 may be formed by milling out a portion of a length of metal of uniform thickness. The sender unit 10 is designed such that at least a line contact, and preferably an area contact, is made between the contact section 31 of member 27 and the resistance element 32, either type of contact insuring a substantially increased life for the sender unit over point contact types of sender units. The integral spring and contact member 27 is substantially less expensive than prior known units. The material from which the member 27 is made is preferably beryllium copper. However, any other metal or alloy may be employed to manufacture this member so long as such metal or alloy may be machined so as to have a mid-section thereof which will provide the flexibility required in the member 27.

There has been disclosed herein a preferred embodiment of a sender unit. While the preferred embodiment was described in conjunction with the utilization of the sender unit in a fuel tank of a motor vehicle, it is understood that the invention is applicable to sender units for other uses. It will be apparent to one skilled in the art that the invention will have many modifications thereof. It is intended that all modifications which fall within the true spirit and scope of this invention be included within the scope thereof.

What is claimed is

1. A sender unit for utilization in indicating the level of liquid within a tank which comprises:
   a tank;
   a housing having an arcuate wall, said arcuate wall being located about a selected axis of said housing;
   means for mounting said housing within said tank;
   a shaft both extending through and rotatably supported by said housing along said selected axis;
   a resistance element mounted along said arcuate wall;
   an integral spring and contact member formed of a single piece of beryllium copper, one end of said member being secured to said shaft and having a substantially enlarged portion of a selected thickness, said member further having a mid-section thereof at which the thickness is reduced to allow a flexing of the member, and the free end of said member being a contact end which forms a line contact with said resistance element, said free end having a thickness similar to the thickness of said enlarged portion of said member secured to said shaft; and
   means secured to said shaft outside of said housing for rotating said shaft and said integral spring and contact member secured thereto to a particular position indicative of the level of liquid within said tank whereby the resistance in a circuit completed through said resistance element, said integral spring and contact member, and said housing is varied in accordance with the liquid level within said tank.

2. A sender unit for utilization in a tank as defined in claim 1 wherein said means attached to said shaft includes:
   an "L" shaped supporting member, the short leg of said "L" shaped member being secured to said shaft outside of said housing; and
   a float secured to the end of the long leg of said "L" shaped member.

3. A sender unit for utilization in indicating the amount of fuel in the fuel tank of a motor vehicle which comprises:
   a housing having an arcuate wall located about a selected axis;
   means for supporting said housing at a position below the top of and within the fuel tank;
   a shaft extending through said housing along said selected axis and supported at opposite ends thereof for rotative movement, respectively, by a side wall of said housing and by said supporting means;
   a generally "L" shaped supporting member attached by the short leg thereof to said shaft at a position adjacent said support means;
   a float attached to the free-end of the long leg of said "L" shaped supporting member;
   a resistance element comprising a plurality of turns of resistance wire wound about an insulating member, said resistance element extending along said arcuate wall of said housing; and
   an integral spring and contact member, said member being formed of a single piece of beryllium copper in such a manner that at the end thereof secured to said shaft, a substantially enlarged portion of the spring and contact member of a selected thickness exists, that at a mid-section thereof the thickness is reduced to allow a flexing of the spring and contact member, and that at the contact section thereof the material is of a thickness equal to the thickness of the section thereof secured to the shaft.

References Cited

UNITED STATES PATENTS

| 1,792,641 | 2/1931 | Huggins | 338—33 |
| 1,796,000 | 3/1931 | Cheney | 338—33 |
| 1,902,933 | 3/1933 | Zubaty | 338—33 |
| 2,266,298 | 12/1941 | Bacon | 338—33 |
| 2,423,603 | 7/1947 | McCandless | 338—33 |
| 2,469,105 | 5/1949 | De Giers | 338—33 |
| 2,551,793 | 5/1951 | De Giers et al. | 338—33 |
| 2,923,156 | 2/1960 | Young | 73—313 |

FOREIGN PATENTS 529,947  9/1956  Canada.

REUBEN EPSTEIN, Primary Examiner

U.S. Cl. X.R.

73—313